(12) United States Patent
Sip et al.

(10) Patent No.: US 8,242,647 B2
(45) Date of Patent: Aug. 14, 2012

(54) OVERLOAD PROTECTION DEVICE FOR MOTOR

(75) Inventors: Kim-Yeung Sip, Shenzhen (CN); Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 525 days.

(21) Appl. No.: 12/546,702

(22) Filed: Aug. 25, 2009

(65) Prior Publication Data
US 2010/0327708 A1 Dec. 30, 2010

(30) Foreign Application Priority Data
Jun. 25, 2009 (CN) .......................... 2009 1 0303669

(51) Int. Cl.
*H02K 11/00* (2006.01)
(52) U.S. Cl. .............. 310/68 B; 310/71; 310/89; 310/91
(58) Field of Classification Search ................ 310/68 B, 310/71, 89, 91
See application file for complete search history.

(56) References Cited

U.S. PATENT DOCUMENTS
5,925,950 A * 7/1999 Lau .............................. 310/68 B
* cited by examiner

*Primary Examiner* — Quyen Leung
*Assistant Examiner* — David Scheuermann
(74) *Attorney, Agent, or Firm* — Altis Law Group, Inc.

(57) ABSTRACT

An overload protection device includes a chassis, a motor, a pair of resilient members, and at least one of electrode. The motor is received in the chassis and includes a stator having a spiral groove defined on the stator and a pair of electrical conductive contacts attached on the stator, a rotor rotatably received in the stator at one end and protruding from the stator at another end. The resilient members are positioned between the chassis and two opposite ends of the motor. The at least one friction bump is attached on the inner side of the chassis and frictionally engaged in the spiral groove of the motor. The electrodes are separately attached on the inner side of the chassis and electrically coupled to electrical conductive contacts of the motor for supply power.

11 Claims, 3 Drawing Sheets

OVERLOAD PROTECTION DEVICE FOR MOTOR

BACKGROUND

1. Technical Field

The disclosure relates to an overload protection device, and more particularly, to an overload protection device for motors.

2. Description of Related Art

Electric motor as a piece of very common equipment is used for converting electrical energy into mechanical energy. Some times, the electric motor is easily damaged by over-current or over-heat during overload conditions. Therefore, varieties of motor overload protection devices are employed to prevent damages to the electric motors during the overload conditions. However, motor overload protection devices proposed heretofore suffer from various significant disadvantages. For example, motor overload protection devices have been proposed to be controlled by a microprocessor. Although the microprocessor provides a greater flexibility in the control features of the overload protection device by monitoring the thermal characteristics of the motor, such microprocessor must be electrically powered up, even when power is disconnected from the motor, in order to calculate the temperature of the motor. Thus, this type of continuously powered motor overload protection devices is vulnerable to any temporary power interruption. Without power supply, the microprocessor is simply unable to track any information indicative of motor cooling during unpowered condition. This is particularly undesirable since the lack of such information essentially disables or prevents the microprocessor from accurately resuming computation of motor temperature once power is resumed. Although schemes which employ battery backup and/or power backup capacitors may enable the microprocessor to track or compute the thermal state of he motor based on its thermal characteristics when the main power to the microprocessor is interrupted, these schemes generally results in devices that are relatively expensive, bulky, complicated and generally require more software support due to their inherent complexity.

Therefore, what is needed is to provide an overload protection device for a motor which is simple in structure and can provide accurate and stable protection for the motor.

DETAILED DESCRIPTION

Figure 1:
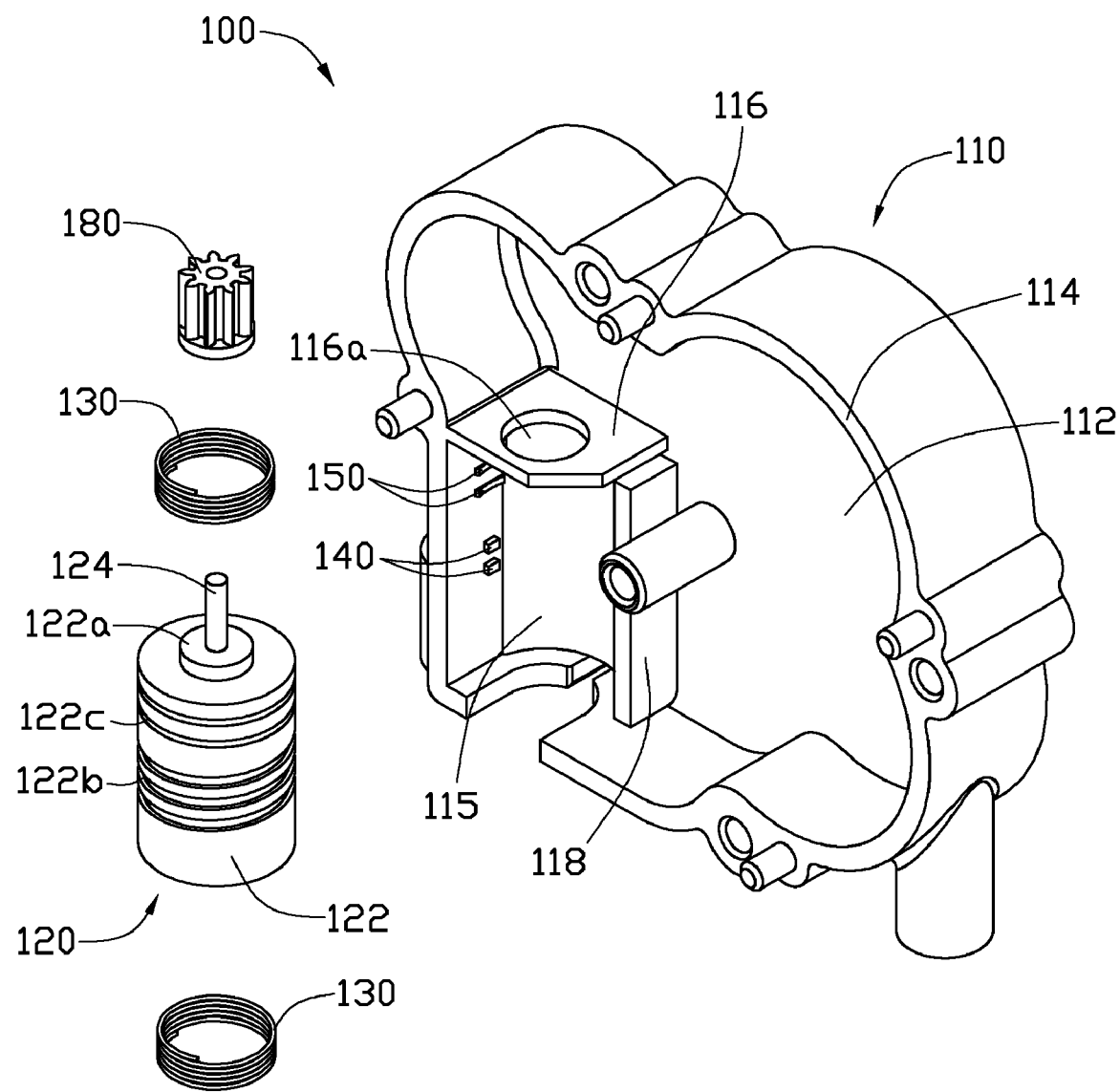
FIG. 1 is an exploded isometric view of an overload protection device according to an exemplary embodiment of present invention.
Figure 2:
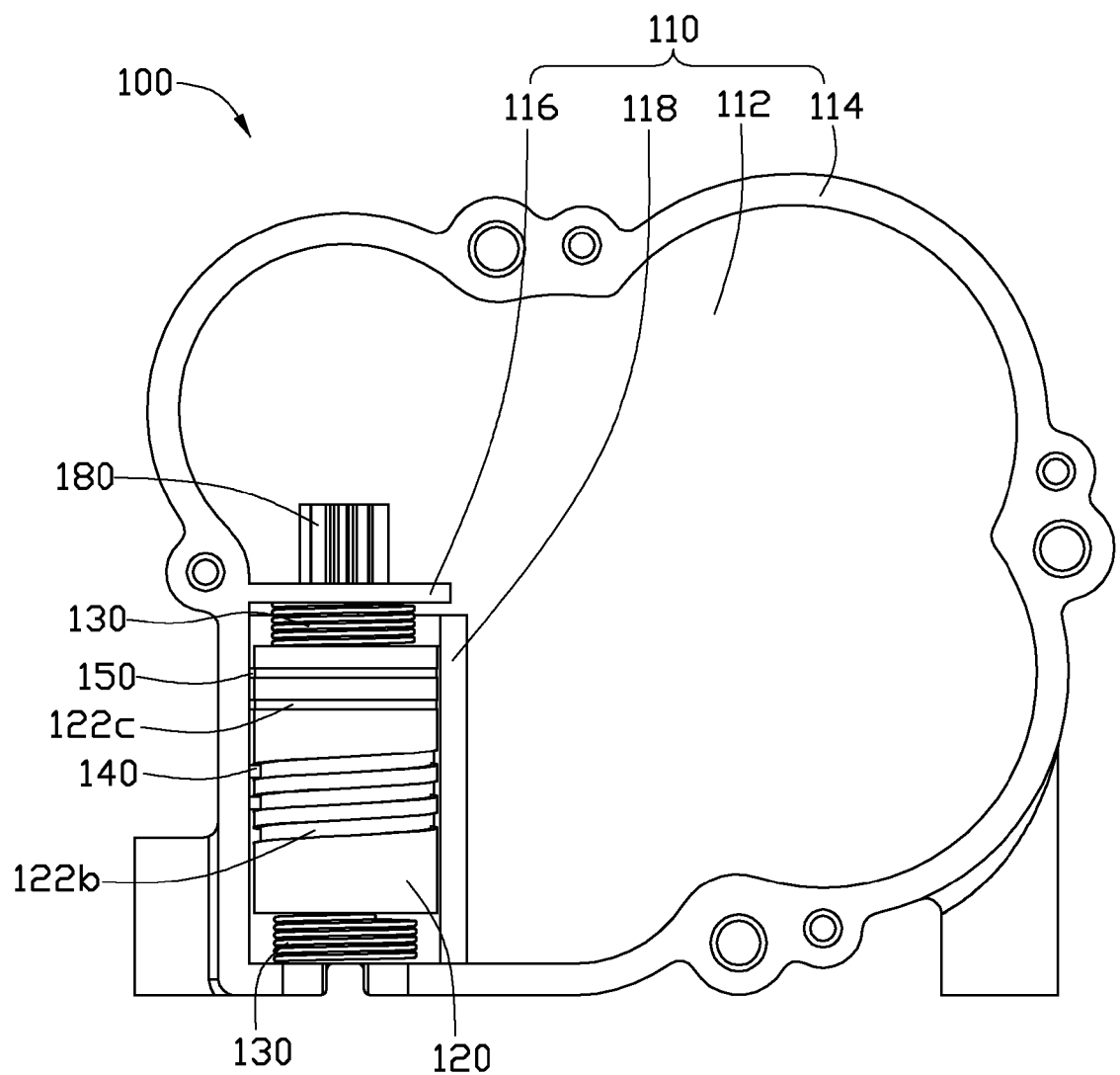
FIG. 2 is an assembled, schematic view of the overload protection device of FIG. 1.
Figure 3:
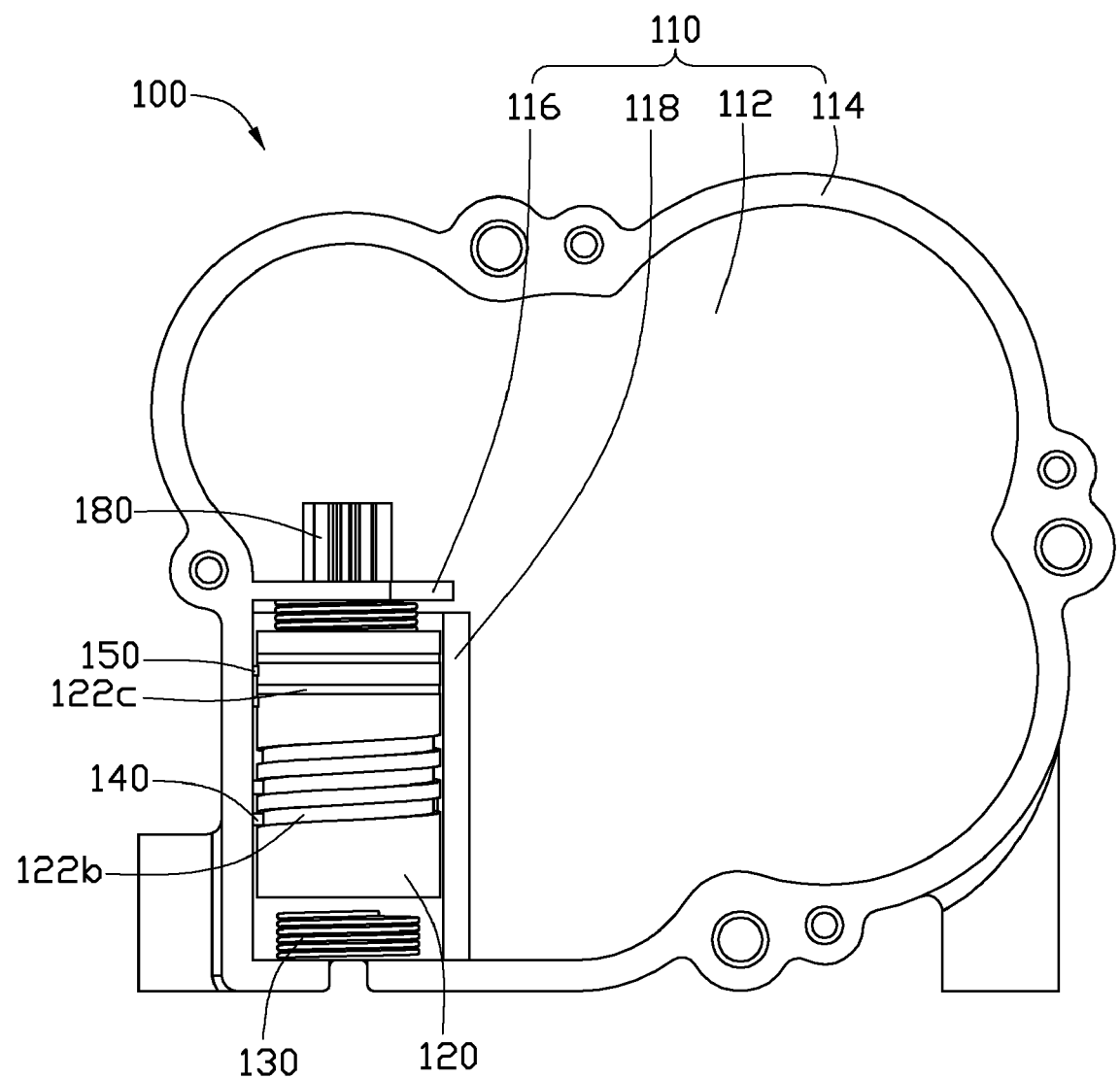
FIG. 3 is a schematic view of the overload protection device of FIG. 1, while being operated.

Referring to FIGS. 1 and 2, an overload protection device 100 according to an exemplary embodiment of present invention is shown. The overload device 100 includes a chassis 110, a motor 120, two resilient members 130, at least one friction bump 140, and a pair of electrodes 150. The motor 120 is received in the chassis 110. The resilient members 130 are positioned between the opposite ends of the motor 120 and corresponding inner surface of the chassis 110. The at least one friction bump 140 is attached on the inner side of the chassis 110 and frictionally engaged with the motor 120 to hold and fix the motor 120 via static friction between the friction bump 140 and the motor 120 when the motor 120 is powered. The pair of electrodes 150 is separately attached on the inner side of the chassis 110 and electrically connected to the motor 120 for supplying power to the motor 120.

The chassis 110 includes a base 112, a side wall 114, a support wall 116, and a limit plate 118. The side wall 114 perpendicularly extends from a periphery of the base 112 to form a closed frame with a right angle corner. The support wall 116 and the limit plate 118 are perpendicularly connected together and cooperatively connected to the right angle corner of the side wall 114 to form a compartment 115 for receiving the motor 120. The support plate 116 defines a circular hole 116a for rotatably receiving one end of the motor 120.

The motor 120 includes a stator 122, and a rotor 124 rotatably received in the stator 122 at one end and protruding from the stator 122 at another end. The motor 120 is an electric motor that is driven by an alternating current. The stator 122 includes a circular protrusion 122a, a spiral groove 122b and a pair of electrical conductive contacts 122c. The circular protrusion 122a projects from a first end of the stator 122 where one end of the rotor 124 protrudes out. The spiral groove 122b is defined in the cylindrical surface of the stator 122. The electrical conductive contacts 122c are belt-shaped and separately attached on the stator 122 around the cylindrical surface and electrically coupled to coils inside the stator 122 for supplying power to the motor. The motor 120 is accommodated in the compartment 115 of the chassis 110 with the circular protrusion 122a inserting into the circular hole 116a.

The resilient members 130 are used for resiliently holding the motor 120 in the compartment 115. One of the resilient members 130 is positioned between the support plate 116 and a first end of the motor 120, the other is positioned between the 114 and another end of the motor 120 opposite to the first end. The resilient member 130 is alternatively selected from one of a helical spring and a leaf spring.

The friction bumps 140 are separately attached on an inner side of the chassis 114 and frictionally engaged in the spiral grooves 122b of the motor 120. Alternatively, the friction bumps 140 can also be attached on the base 112 or on the limit plate 118, as long as it can be inserted into the spiral grooves 122b. Between each friction bump 140 and the stator 122 of the motor 120, static friction is produced when the motor 120 is powered. The static friction is applied on the stator 122 to produce a torque that will prevent the stator 122 from rotating due to a counter-torque produced by the rotor 124 when the motor 120 is powered. Thus, static friction can keep the motor 120 in position when the motor 120 is powered under the rated load that is standard for the motor 120 to work effectively and safely. When the motor 120 operates at a rated load, an absolute value of the torque applied on the stator 122 by a critical static friction between the stator 122 and the friction bumps 140, is equal to an absolute value of a counter-torque applied on the stator 122 by the rotor 124. Once the motor 120 overloads, the counter-torque will be greater than torque produced by the friction, as a result the stator 122 will rotate relative to the rotor 124, as a result the motor 120 will escape from it's original position and therefore interrupting power supply of the motor 120 to protect the motor 120 from damage during overloading condition.

The electrodes 150 are attached on the inner side of the chassis 114 and electrically coupled with the electrical conductive contacts 122c of the motor 120. Alternatively, the electrodes 150 can also be attached on the base 112 or the limit plate 118, as long as the 150 can be electrically coupled with the electrical conductive contacts 122c. The electrodes 150 are connected to a power source to provide power to the motor 120. Exemplarily, a width of each of the electrodes 150 is equal to or slightly smaller than a width of a corresponding electrical conductive contacts 122c along a direction parallel to the shaft axis of the rotor 124 of the motor 120.

In use, when the motor 120 overloads, the counter-torque of the rotor 124 would drive the stator 122 to rotate relative to the side wall 114 and the limit plate 118. During the rotation of the stator 122, the spiral grooves 122b slides along the stationary friction bumps 140 thereby driving the motor 120 to move forwards or backwards along the axis of the rotor 124. As the motor 120 moves, the electrodes 150 gradually disengages from the electrical conductive contacts 122c to interrupt the power supply of the motor 120 thereby shutting down the motor 120 and preventing the motor 120 from being damaged. At the same time, one of the resilient members 130 becomes compressed by the stator 122 of the motor 120. When the motor 120 is no longer overloaded, the compressed resilient member 130 rebounds to its nature state and restores the motor 120 to its original position to reestablish the electrical connection between the electrical conductive contacts 122c and electrodes 150.

In present invention of the overload protection device 100, the motor 120 can be constantly protected by mechanical structure without any exceptional interrupt such as power off of the microprocessor in related art. The stability and precision for protecting the motor 120 is significantly improved and enhanced.

In addition, a gear 180 is provided to be installed on the rotor 124 for outputting the torque of the rotor 124.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An overload protection device comprising:
   a chassis;
   a motor received in the chassis and comprising a stator having a spiral groove defined on the stator and a pair of electrical conductive contacts attached on the stator, and a rotor rotatably received in the stator at one end and protruding from the stator at another end;
   a pair of resilient members respectively positioned between two opposite ends of the motor and the chassis;
   at least one friction bump attached on the inner side of the chassis and frictionally engaged in the spiral groove of the motor; and
   a pair of electrodes separately attached on the inner side of the chassis and electrically coupled to electrical conductive contacts of the motor for supply power to the motor;
   wherein, when the motor operates at a rated load, an absolute value of a torque applied on the stator by a critical static friction between the stator and the friction bumps, is equal to an absolute value of a counter-torque applied on the stator by the rotor; and when the motor overloads, the counter-torque will be greater than the torque produced by the friction, so that the stator will rotate relative to the rotor and move forwards or backwards to disengage the electrical conductive contacts from the electrodes thereby shutting down the motor.

2. The overload protection device as claimed in claim 1, wherein the chassis comprises a base, a side wall perpendicularly extending from a periphery of the base to form a frame with a right angle corner, a support wall and a limit plate perpendicularly connected to the support; the support wall and limit plate are cooperatively connected to the right angle corner of the side wall to form a compartment for receiving the motor.

3. The overload protection device as claimed in claim 2, wherein the support wall comprises a circular hole defined therethrough; one end of the motor is received in the circular hole.

4. The overload protection device as claimed in claim 3, wherein the stator comprises a circular protrusion projected from a first side of the stator where the one end of the rotor protrudes out; and the circular protrusion is ratably received in the circular hole of the support wall.

5. The overload protection device as claimed in claim 3, wherein the electrodes are attached on the side wall corresponding to the electrical conductive contacts of the motor.

6. The overload protection device as claimed in claim 3, wherein the electrodes are attached on the limit plate corresponding to the electrical conductive contacts of the motor.

7. The overload protection device as claimed in claim 3, wherein the friction bumps are attached on the side wall corresponding to the spiral groove of the stator.

8. The overload protection device as claimed in claim 3, wherein the friction bumps are attached on the limit plate corresponding to the spiral groove of the stator.

9. The overload protection device as claimed in claim 3, wherein the spiral groove is defined in the outside of the stator.

10. The overload protection device as claimed in claim 3, wherein the resilient member is a helical spring or a leaf spring.

11. The overload protection device as claimed in claim 3, wherein a width of each electrode is equal to or slightly smaller than a width of a corresponding electrical conductive contacts along a direction parallel to the shaft axis of the rotor of the motor.

* * * * *